Figure 3:
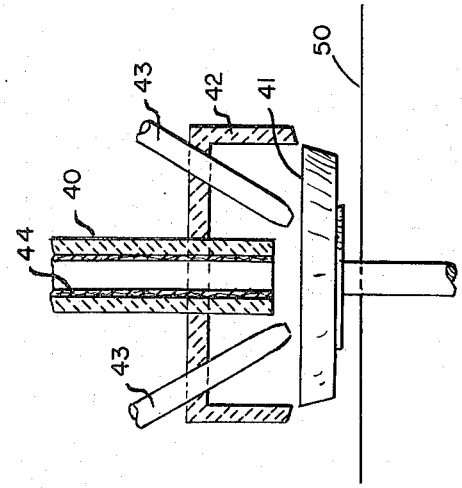

United States Patent
Schott

[15] 3,694,528
[45] Sept. 26, 1972

[54] METHOD FOR MAKING SPHERICAL BEADS

[72] Inventor: Charles W. Schott, 4769 Barone Drive, Pittsburgh, Pa. 15227

[22] Filed: May 11, 1970

[21] Appl. No.: 35,962

[52] U.S. Cl. ............................................. 264/8
[51] Int. Cl. ....................................... B01j 2/12
[58] Field of Search .................................. 264/8

[56] References Cited

UNITED STATES PATENTS

| | | | |
|---|---|---|---|
| 3,499,745 | 3/1970 | Plumat | 264/8 |
| 3,346,673 | 10/1967 | Last et al. | 264/8 |
| 3,097,085 | 7/1963 | Wallsten | 264/8 |
| 2,897,539 | 8/1959 | McMillan | 264/8 |

Primary Examiner—Robert F. White
Assistant Examiner—J. R. Hall
Attorney—Buell, Blenko & Ziesenheim

[57] ABSTRACT

A method is provided for pelletizing molten materials which consists in feeding the material to be pelletized downwardly through a vertical refractory tube through a controlled atmosphere and discharging the same horizontally from a rotating circular edge across the surface of a fluid coolant.

5 Claims, 3 Drawing Figures

PATENTED SEP 26 1972

3,694,528

INVENTOR
Charles W. Schott

METHOD FOR MAKING SPHERICAL READS

This invention relates to methods for making solid or cellular spherical beads and particularly to methods for making beads from molten materials such as glass, slag, alumina, and other high melting point materials, earths, metals and the like.

There is a very substantial demand for solid and high strength cellular beads of a great variety of materials such as glass, slag, metal and the like. These beads are used for a great variety of purposes, e.g., as proppants in oil well drilling, as reflectors in reflective paints, etc. There is particularly a need for a method of converting metallurgical slag to a high strength low porosity pellets suitable for substitution for glass pellets.

I have discovered a method which provides unique control over the bead formation and permits beads to be made of almost any normally solid material in its molten state. I have found, for example, that by maintaining a reducing condition at the apparatus, I can make blast furnace slag beads which have a crystalline structure. With the same material, I can produce a transparent amorphous pellet under neutral and mildly oxidizing conditions or with a highly oxidizing condition, I can produce a black, shiny, glass-like opaque bead. Thus, I have a very high degree of control over the product which is produced by the practice of my invention.

Preferably I feed the molten material to be pelletized or formed into beads axially downwardly through a rotating refractory tube through a controlled atmosphere and discharge the same horizontally from the rotating circular edge. Preferably the beads or pellets are discharged horizontally across a fluid coolant so that they contact the surface of the coolant in a rolling action effecting rapid submergence which reduces the temperature rapidly without undue shock and permits the material to reach equilibrium. The refractory tube is preferably formed of carbon terminating in a hollow frusto conical shape with the molten material being fed in at the smaller end and discharged from the periphery of the larger bottom end. The tube is rotated and the bottom circular edge acts as the discharge edge or a stationary tube may discharge centrally onto a rotating disc at its bottom, which disc provides the rotating circular discharge edge. The controlled atmosphere may be reducing, neutral or oxidizing and may be created, at least in part by a carbon arc within the tube or by a gas burner within the tube.

Oxidizing atmosphere may be created in conjunction with the carbon arc by permitting air to flow upward over the surface of the molten material while the carbon arc operates centrally within the tube. Air is highly heated as it passes between the arc and the surface of the molten material.

Figure 2:
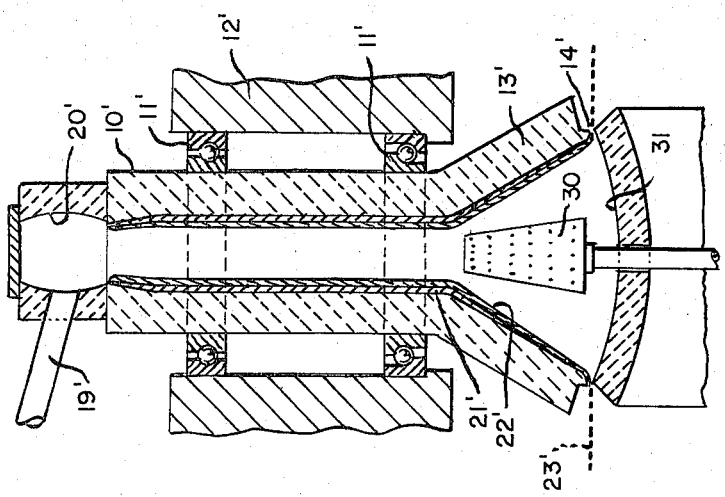
Figure 1:
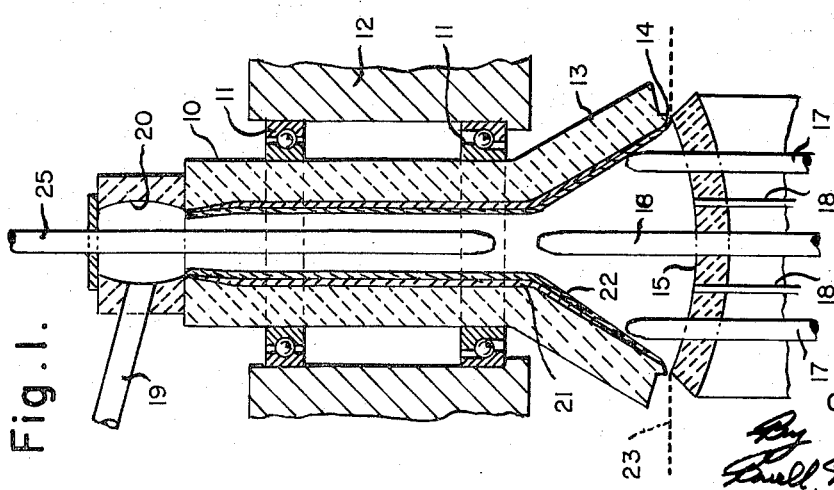

In the foregoing general description of my invention, I have set out certain objects, purposes and advantages of this invention. Other objects, purposes and advantages of this invention will be apparent from a consideration of the following description and the accompanying drawings in which, FIG. 1 is a side elevation, partly in section of an apparatus for practicing the method according to this invention;

FIG. 2 is a side elevational view of a second embodiment of an apparatus for practicing the method according to my invention; and FIG. 3 is a side elevational view partly in section of a third embodiment of an apparatus for practicing the method according to this invention.

Referring to the drawings, I have illustrated a graphite tube 10 mounted in an annular support ring 11 rotatable on spaced supports 12. The tube 10 is enlarged at its lower end into a frusto conical member 13 having a machined annular discharge lip 14. A concave heat reflector 15 is shown beneath the frusto conical member 13 with its edge parallel to and spaced from the outer edge of the frusto conical member 13. The heat reflector may be any other suitable shape e.g., convex, or frusto conical, or pointed, as desired because the heat reflector does not engage the molten material. A central electrode 16 allowing vertical movement and lateral electrodes 17 are provided in the reflector 15 extending upwardly into the cone 13. These electrodes are connected to a source of electrical current (not shown) for causing an arc to move from one to another of said electrodes whereby a high temperature may be created within the area beneath the cone 13. Inlet nozzles 18 are provided in the reflector 15 to permit air or other gas to be introduced into the area beneath the cone 13 whereby the nature of the atmosphere surrounding the molten material within the cone can be controlled. The molten material to be pelletized or beaded is introduced through inlet pipe 19 into a feeder 20 which discharges into the top of tube 10. Molten material is introduced into feeder 20 and distributed along the inner wall of the tube 10. The first such material will solidify to form a thin protective lining 21 along the inner wall of the tube 10 and cone 13 after which the molten material 22 will flow downwardly along the inner wall of tube 10 and cone 13 and be discharged as pellets 23 or beads from the rotating periphery of discharge lip 14. The thickness of the protective lining 21 may be controlled by heating or cooling the exterior of tube 10 with an air blast or a blast of hot gases (not shown) or by changing the rate of feed. The ring 11 is driven by a motor (not shown) through a gear train (not shown).

A carbon electrode 25 may extend downwardly in tube 10 to be used with or alternatively to electrodes 17.

The foregoing arrangements permit great latitude in the control of fluidity of the molten material in tube 10. It provides the following possibilities:

a. Arc heating wherein the arc moves between electrodes 16 and 25 and in which the position of the arc may be adjusted by vertical movement and lateral movement of the electrodes 16 and 25;

b. Resistance heating wherein the lateral electrodes 17 are of opposite polarity and the circuit is completed through the molten material 22;

c. A combination of arc and resistance heating using the several electrodes at the same time.

The size of the beads or pellets produced by the foregoing apparatus can be adjusted by the rate of feed of molten material into the tube, by the speed of rotation of the tube, by the degree of flair or slope at the frusto conical end of the tube, by the temperature at the discharge end of the tube or by any combination thereof. Cellular beads possessing very uniform bubbles have been produced from slags and glass when the molten material is subjected to the high temperature carbon vapor zone of the arc provided the carbon vapor zone is located close to the discharge edge of the apparatus. This creates a reducing condition. The molten material foams, but is discharged immediately (in pellet form) from a near horizontal plane.

Cellular beads of this type may be discharged on a cool flat solid surface such as concrete or metal.

The apparatus illustrated in FIG. 2 is essentially the same as that of FIG. 1 except that instead of the electrodes for heating, I provide a generally conical gas burner 30 centrally of reflector 31. All other parts are identical and bear like numbers with the addition of a prime sign.

The apparatus illustrated in FIG. 3 provides a hollow graphite feed tube 40 extending vertically above a rotating disc 41. A heat reflector hood 42 surrounds the feed tube 40 and extends to a point adjacent the periphery of disc 41. Electrodes 43 extending downwardly through the hood may be adjusted so as to contact molten material on disc 41 and heat by resistance or they may be used to arc above the material to form an arc heating system or a combination of the two. Molten material 44 to be pelletized or beaded is fed into the upper end of tube 40 and flows down onto the axis of rotating disc 41 where it moves radially outwardly to the edge forming a film over the disc and is discharged as beads. The electrodes 43 are used to heat the molten material to increase its fluidity or to add carbon or to otherwise modify it as has already been discussed in connection with FIG. 1.

The feed tube 40 may be a consumable tube which itself supplies the material for pelletizing. For example scrap pipe may form the tube and be melted at its lower end while being rotated at high speed thus causing beads to be discharged.

The rate of feed and amount of heating may in all cases be regulated by the shape of the tube. For example the tube may be enlarged intermediate its ends so as to retard downward movement. With such an apparatus "fly ash" can be melted and pelletized in the tube without prior melting.

The method of my application can perhaps be best understood by describing it in connection with the treatment of blast furnace slag to pelletize the same.

Molten slag is caused to flow through the spinning tube which possesses great conductive ability for the inherent heat of the process.

The initial flow of molten material enters the top end of the tube, but due to the tube's heat conductivity, the material begins a progressive solidification against the inside wall (i.d.) which forms a lining from top to bottom of the tube. Because of the rapid solidification and release of gases during solidification the lining forms a porous insulating barrier between the tube wall and the molten material that continues to flow. It is to be understood that the lining is solid against the tube wall and possesses a temperature gradient which increases in the direction away from the tube wall so that the lining nearest the central axis of the tube is at approximately the same temperature as that of the feed molten material.

The thickness of the lining may be controlled by extracting more or less heat through the tube walls via air or water spray cooling as well as rate of feed.

I have found that for a spinning graphite tube having a one-half inch thick wall the boundary air on the outside surface is sufficient to maintain a one-eighth inch thick lining over the I.D. even though a carbon arc was maintained within one-half inch of the lining. The arc was maintained with five-sixteenths inch electrodes at 75 amps + 30 volts.

After the above mentioned lining is formed molten slag, etc. continues to flow through the tube in a downward direction until it reaches the discharge end.

In this process, a continuous flowing film of molten material is formed from the point of feed-in at the top of the tube to the discharge point at the bottom of the tube. The discharge point is the point at which the film reaches its maximum diameter and contact with its restraint is eliminated.

The restraint may be a flat disc (FIG. 3) over which the molten material is urged to flow as a film in contact with the entire disc surface or the restraint may be a short truncated cone section (FIGS. 1 and 2) with concavity sloping upward or downward or the restraint may be a saucer-shaped disc. The shape of the restraint may be selected according to the length of time the molten material is to be subjected to any desired set of conditions.

The straight cylindrical tube offers the shortest film spread because in this case the molten material will be in partial restraint over only the distance of the wall thickness from supply to pelletizing or rupture point.

ACTION AT DISCHARGE POINT

I have found that transparent pellets may be produced from furnace slag merely by causing molten slag to react with the boundary air that attends a spinning shape.

The reaction between molten blast furnace slag and air is exothermic and continues to completion as the slag remains molten and has an adequate supply of air contacting the surface. The various elements in blast furnace slag (and other furnace slags as well) which are capable of being oxidized such as carbon, sulfur, carbon monoxide, etc. will react with air to produce heat and aid pelletization and I have taken full advantage of this phenomenon in my process.

In my work I have found that blast furnace slag that possesses the elements normally inherent in the slag at the time of discharge from the furnace may be (while still molten) spun through air with the result that the slag changes from a limey crystalline appearance progressively to a transparent amorphous appearance. The lead side of the slag becomes clear first and this will continue as long as the slag remains molten and air is present until the entire mass becomes transparent.

In my process I control the rate and duration of this exothermic reaction and dictate the time prior to pelletization that the reaction will take place.

I produce crystalline pellets from furnace slags by processing the slag in an air excluded atmosphere. In other words, I process the slag in its own gases while maintaining a molten state just sufficient to cause pellets to form at the discharge end of the apparatus. At the discharge point or zone I maintain an ambient atmosphere of a reducing nature again, excluding air so that the forming pellets do not react to become transparent and noncrystalline.

I have found that blast furnace slags for example are highly absorbant relative to carbon from carbon bearing gases at temperatures as low as 1,600° F. This absorption can be made to take place in a carbonaceous atmosphere without causing bubbles to form within the slag.

I have transformed transparent amorphous slag into crystalline opaque slag merely by heating the transparent slag in a carbonaceous (reducing) atmosphere. This reaction was evident at temperatures as low as 1,600° F.

In my process I produce crystalline pellets merely by processing the molten slag in its own gases and maintaining a carbonaceous atmosphere through the pelletizing stage of operation. This carbonaceous atmosphere is blown through the opening between the heat reflector and the ends of the tube (or if a flat disc is used between the heat reflector 42 and the edge of the rotating disc). The atmosphere envelopes the pellets as they fly to the coolant surface 50, hereafter described and solidify. Note, in the production of transparent non-crystalline pellets the carbonaceous atmosphere is omitted and an atmosphere equivalent to air is substituted within the lower end of the tube and is blown out in the same manner so as to form an oxidizing or neutral envelope.

Pelletizing methods of the prior art normally require that metal be excluded from the slag prior to pelletizing to avoid explosions.

In my process, separation of molten metal from the molten slag is not required. In fact, I have pelletized metal and slag simultaneously with no fear of explosions.

Separation of slag and metal may be made in the process and two useful products result. Each will offset the cost of producing the other. This is unique to my invention.

In fact, I claim a method of producing both metal shot and mineral pellets in one operation wherein waste materials such as metal chips and grinding dust are introduced into the tube or into the molten slag as it enters the apparatus (or prior to entry) and the combination is processed into pellets of a useful nature.

It is well known that slags discharged from furnaces are well in excess, temperature wise, of their melting points or solidification points. If metal chips or grinding dust is added to the slag much of the excess temperature may be utilized to melt the metal. I have produced lead, copper, steel and nickel pellets simultaneous with slag and glass pellets in this method.

In regard to grinding dust resulting from grinding various grades of steel it is known that the grinding dust from stainless steel conditioning contains nickel, chromium, iron and other various valuable elements. Under the reducing conditions capable in this pelletizing method these elements can be recovered in the form of pellets.

Also, grinding dust contains approximately 10 to 15 percent $Al_2O_3$ which adheres tightly to the metal. This $Al_2O_3$ may be recovered and added to the slag composition thereby enhancing the properties of the slag.

Heavy additions of waste metal to liquid slag may be made and pellets of metal and slag produced or metal and slag solids or metal and glass solids may be used to produce beads because the process provides means to heat the molten materials or solids being processed.

DELIVERY OF PELLETS TO COOLANT SURFACE

Pellets are discharged from the film of molten material in a single plane and each pellet fans out giving an ever increasing space separating each pellet.

Since the pellets discharge in a single plane, I locate the discharge as close to the surface of the coolant as possible (as close as one-sixteenth inch to the coolant surface) and thereby deliver the pellets onto the coolant surface with an angle of incidence so small that upon striking the coolant surface the pellet immediately begins to rotate with a minimum of impact and the entire pellet surface is cooled rapidly and uniformly resulting in spherical shapes as little as 0.001 inch out of round as determined on pellets measuring 0.030 to 0.200 inch diameter (not the limit of sizes).

Pellets of glass may be similarly produced by this method wherein the molten glass flows to the discharge end of the film and is heated well above the last equilibrium temperature just prior to the pelletizing operation.

The glass is heated using either carbon arc or gaseous heat to a point where the molecular cohesion becomes so small because of the high temperature and formation of relatively large gas bubbles within the glass thereby reducing the total glass cross section in the glass film that the glass film ruptures into discrete pellets under the influence of centrifugal force. The pellets are discharged onto the surface of very hot (180° F.) to boiling water where upon the gas bubbles within the pellets are observed to shrink and the glass itself begins to shrink throughout the pellet's mass and eventually the pellet shrinks to a substantially solid form. Because the glass and gases within are superheated to the same degree the pellet shrinks to a compact form from the center of the mass rather than from the surface inward as in prior arts.

I have found that a neutral to oxidizing temperature condition whereby the glass is heated to above 2,800° F. and higher and the glass develops a light amber tinge will produce pellets of useful purpose.

Where a cellular product is desired the arc is adjusted, close to the discharge point and so that glass is in the vaporized carbon gas area.

While I have set out certain preferred practices and embodiments of my invention in the foregoing specification, it will be understood that this invention may be otherwise practiced within the scope of the following claims.

I claim:

1. The method of making spherical pellets of generally uniform size from molten material comprising the steps of:
   a. continuously feeding a molten material at a controlled rate along the internal walls of a confining vessel of generally frusto conical shape rotating about a vertical axis while radially restraining said material by said confining vessel;
   b. heating the material in the confining vessel in a controlled atmosphere to provide a desired fluidity and composition;
   c. discharging the molten material as spheres from a rotating circular edge at the large end of the frusto conical vessel at a controlled rate; and
   d. cooling the discharged material in a fluid coolant.

2. The method as claimed in claim 1, wherein the heating is accomplished by an electric arc.

3. The method as claimed in claim 1 wherein the atmosphere is an oxidizing atmosphere.

4. The method as claimed in claim 1 wherein the atmosphere is a reducing atmosphere.

5. The method as claimed in claim 1 wherein the atmosphere is a neutral atmosphere.

* * * * *